United States Patent [19]

Shinno

[11] Patent Number: 5,127,535
[45] Date of Patent: Jul. 7, 1992

[54] QUICK-ACTING CLOSURE WITH SLIDING RETAINING-RING

[75] Inventor: Toru Shinno, Kitakyushi, Japan

[73] Assignee: Nippon Steel Corporation, Tokyo, Japan

[21] Appl. No.: 651,615

[22] Filed: Feb. 6, 1991

Related U.S. Application Data

[63] Continuation-in-part of Ser. No. 412,773, Sep. 26, 1989, abandoned.

[30] Foreign Application Priority Data

Sep. 28, 1988 [JP] Japan ............................ 63-126933[U]

[51] Int. Cl.⁵ .............................................. B65D 45/28
[52] U.S. Cl. .................................................. 220/323
[58] Field of Search ................ 220/319, 320, 323, 328; 138/89

[56] References Cited

U.S. PATENT DOCUMENTS

| | | | |
|---|---|---|---|
| 4,387,740 | 6/1983 | Vanzant | 138/89 |
| 4,693,278 | 9/1987 | Wilson et al. | 138/89 |
| 4,815,627 | 3/1989 | Marshall | 220/315 |
| 4,883,637 | 11/1989 | McDaniels, Jr. | 220/323 X |

Primary Examiner—Stephen P. Garbe
Assistant Examiner—Nova Stucker

[57] ABSTRACT

A quick-acting closure with a retaining-ring, which enables fixture and detachment of a shell and a cover of a pressure vessel by the retaining-ring comprising, a circular groove formed on the inner face of the shell of the pressure vessel, and holes formed through the shell at a plurality of places in the circumferential direction of the circular groove, and a rod inserted through the holes and connected with the retaining-ring, wherein retaining-ring is positioned to be freely moved to the radial direction of the shell, the shell and the cover are fixedly installed by the retaining-ring engaging with the circular groove of the shell and the cover when the retaining-ring is moved forward to the inside direction of the diameter of the shell, and the retaining-ring is retracted into the circular groove to make the shell and the cover detachable when the retaining-ring is moved backward to the outside direction of the diameter. The closure may further comprises a protrusion formed on opposite sides of the cover to form space for retracting the retaining-ring therein.

3 Claims, 5 Drawing Sheets

QUICK-ACTING CLOSURE WITH SLIDING RETAINING-RING

This application is a continuation-in-part of application Ser. No. 07/412,773, filed Sep. 26, 1989.

BACKGROUND OF THE INVENTION

1. Field of the Invention

The present invention relates to a quick-acting closure with sliding retaining-ring. Clamp-type, clutch-type, and also screw-type, or press-frame type closures are used as quick-acting closures for pressure vessels which have been utilized widely in the chemical industry, food industry and various other industries.

Furthermore, as a simple closure which does not quickly act, a retaining-ring type closure has also been used.

Recently, the use of pressure vessels whose covers are frequently opened and closed has been increasing in high pressure experiments, or high-pressure or super-high pressure commercial applications.

2. Description of the Related Art

FIGS. 4A and 4B show a conventionally used closure with a retaining-ring which is sealed by sealing means around the radially facing peripheral surface thereof (ASME SEC.VIII Div. 1, FIG. UG-34,(m), Some Acceptable Types of Unstayed Flat Heads and Covers). After a cover 1 is fitted into a shell 2, the cover is fixed by moving a segmental retaining-ring 3 (the ring is divided into eight segments 3a in the example of this drawing) to a position shown in FIGS. 4A and 4B and by positioning it in place. The horizontal movement a of the retaining-ring 3 is performed manually and the vertical movement b by a crane.

An explanation of the actuation of a vessel cover with the following specifications (as an example) will be given.

Vessel Dimension: Inside Diameter 500 mm × Inside Height 1000 mm
Vessel Fabrication: Forging, Solid-Ring Type
Vessel Material: ASME SA-723 Gr. 3 Cl. 3
Design Pressure: 1500 kgf/cm$^2$
Test Pressure: 1800 kgf/cm$^2$
Cover Type: Retaining-Ring
Operating: Opened by hand
Seal Material: Rubber-Ring
Shell Thickness: 200 mm
Shell Weight: Approx. 8 Ton
Cover Thickness: 200 mm
Cover Weight: Approx. 1 Ton
Retaining-Ring Weight: Approx. 20 kg per segment After the cover 1 is brought by a crane to the shell 2 to be fitted therein with a sealing projection 1a extending into the mouth of the vessel, the upper surface 1b is slightly below the level of the lower surface 2b of a retaining-ring receiving recess 2a opening out of the inner surface of the wall of the vessel 2. The retaining-ring segments 3a are then placed on the cover. When there is no pressure in the vessel, the bottom surface 3b of the segments 3a of the ring which are resting on the cover surface 1b will be slightly below the lower surface 2b of the recess 2a, as shown in FIG. 4C. Then they are moved manually slightly upwardly and in the radial direction to be positioned in place as shown in FIGS. 4A and 4B. Thus the cover of the vessel is retained in the closed position. High pressure (1500 kgf/cm$^2$ in the example) is introduced and maintained for a certain time by a high-pressure pump through a liquid inlet nozzle 5, and then the vessel is depressurized. The internal pressure is retained by a radially facing seal 4 between the sealing projection 1a and the mouth of the vessel, which permits the cover 1 to be raised against the retaining-ring 3, which in turn abuts the upper surface 2c of the recess 2a, due to the internal pressure without raising the cover sufficiently far to break the seal at seal 4. Thereafter, when atmospheric pressure is once again reached in the interior of the vessel, the cover is opened by the segments of the retaining-ring 3, which are now only loosely engaged with the cover 1, being manually slid toward the center in the radial direction and the segments are lifted upward one by one to remove the retaining-ring. Then the cover is removed. The series of operations described above is repeated as a batch-process.

The most important point from the point of view of the operation efficiency is the time required for opening and closing the cover. In this example, approximately two hours are required. It is very important that the time for opening and closing the cover should be shortened to improve the operation efficiency.

Part of this time is consumed by the necessity for and difficulty in slightly lifting the segments to get them from the level of the upper surface 1b of the cover 1 to the level of the lower surface 2b of the recess 2a. Moreover, when internal pressure builds up in the vessel 2 and the cover 1 rises slightly, the segments 3a tend to be tilted and held between the peripheral edge 1c and peripheral edge 2d of the upper part of recess 2a in edge-to-surface contact, as shown in FIG. 4D, which is undesirable from the standpoints of strength requirements for the vessel and the ring segments and the lifetime of these parts. The increased stress on the parts due to the edge-to-surface contact shortens the life of these parts. Modifying the arrangement to raise the level of the upper surface 1b of the cover 1 either to the same level as the surface 2b or above the surface 2b, as shown in FIGS. 4E and 4G, to make it easier to slide the segments 3a into the recess 2a does not alleviate the problem because the clearance 5 between the level of the upper surface of the segments 3a and the upper surface of the recess 2a must be increased to make it possible to move the segments 3a into the recess 2a, as shown in FIGS. 4F and 4H.

As has been described, in the conventional arrangement, it is required that the segments of the retaining-ring be manually moved in the radial direction after the ring has been lowered on the cover by a crane. Therefore, the method has the following disadvantages.

1. It is necessary to manually attach or detach the heavy retaining-ring every time the cover is opened or closed. This is not desirable from the point of view of safety.

2. At the same time, it takes a lot of time for the cover closing the opening operation, resulting in considerable idle time in the overall operation, thus lowering operation efficiency.

3. Because of the edge-to-surface contact of the segments and the edge of the retaining-ring receiving recess, the stress on the various parts shortens the life of the apparatus.

4. Accordingly, the conventional arrangement has proved to be unsatisfactory for a quick-acting closure.

SUMMARY OF THE INVENTION

It is accordingly an object of this invention to provide a quick-acting closure with a retaining-ring to solve the above problems, by which a cover of the pressure vessel is made fixable to and detachable from the shell by a retaining-ring, characterized in that a circular groove is formed in the inner face of the shell of the pressure vessel and also holes are formed through the shell at a plurality of places in the circumferential direction of the circular groove, a rod is inserted through each hole and connected to the respective segments of the retaining-ring, the segments of the retaining-ring are positioned to be freely moved in the radial direction of the shell so as to be retractable into the circular groove, and the cover is fixedly installed on the shell by the segments of the retaining-ring within the circular groove of the shell being moved radially inwardly of the shell, and the segments of the retaining-ring are retracted radially outwardly into the circular groove to make the cover detachable from the shell.

DETAILED DESCRIPTION OF THE PREFERRED EMBODIMENTS

The first embodiment of a closure according to the present invention will be described with reference to FIGS. 1(A), 1(B), 2(A) and 2(B).

Figure 1A:
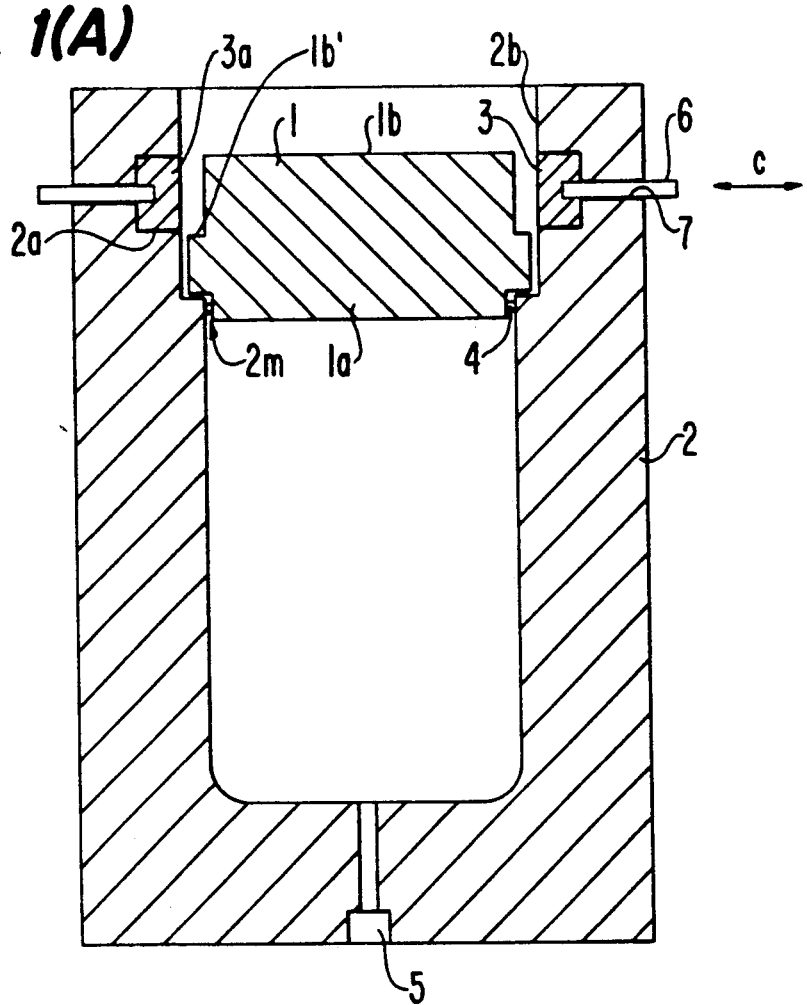
FIG. 1(A) is a vertical sectional view of one embodiment of a quick-acting closure according to the invention showing the state before the retaining-ring of the quick-acting closure is engaged with the cover.
Figure 1B:
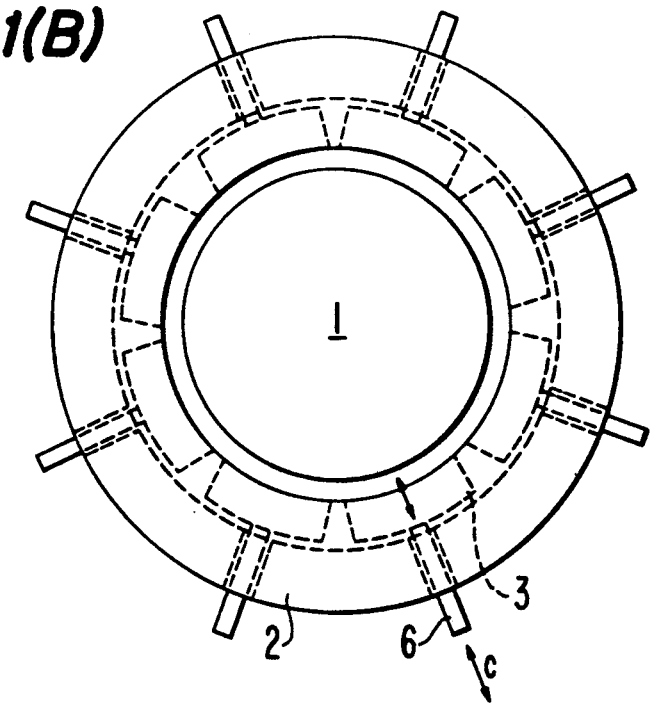
FIG. 1(B) is a plan view of the closure of FIG. 1(A)
Figure 4A:
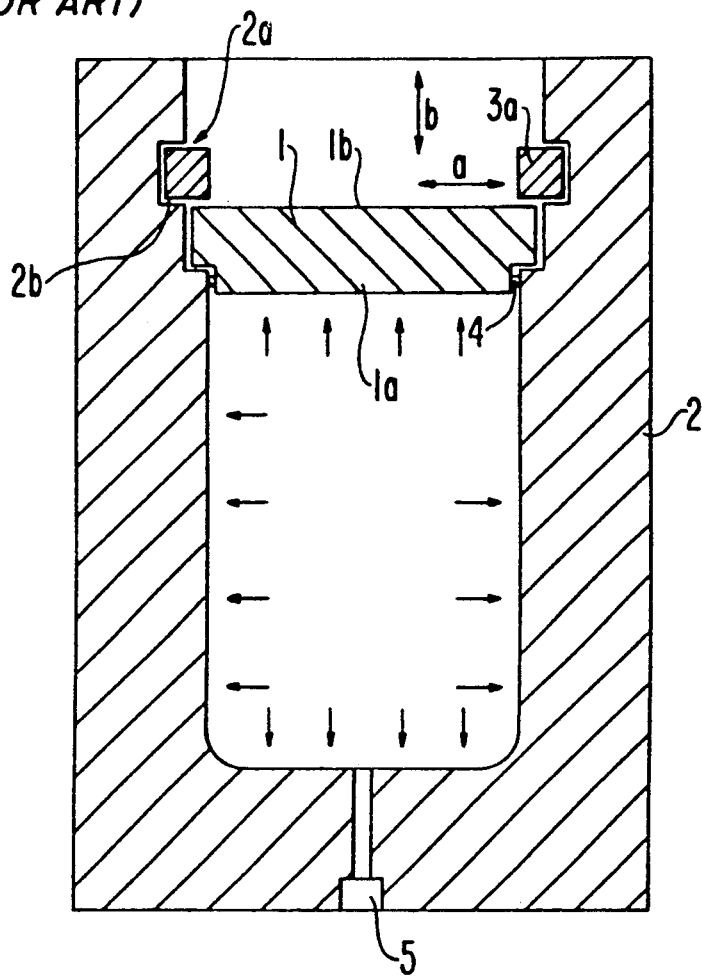
FIG. 4(A) is a vertical sectional view of a conventional closure with a retaining-ring.
Figure 4B:
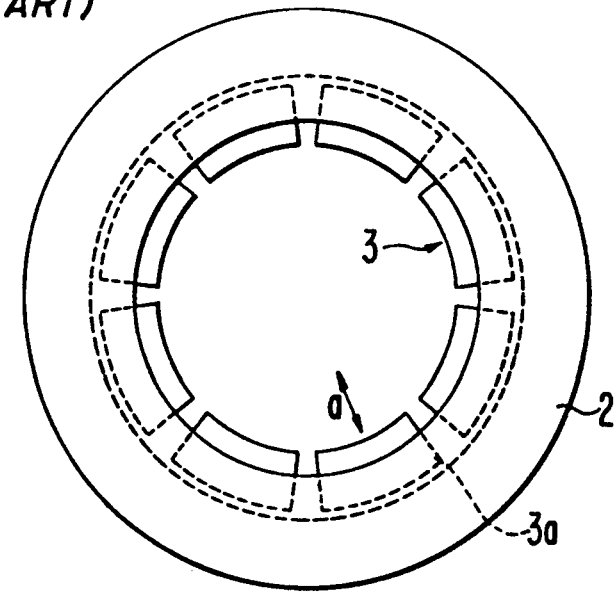
FIG. 4(B) is a plan view of the closure of FIG. 4(A), and FIGS. 4(C)–4(H) are partial sectional views showing the parts in the non-retaining and retaining positions.
Figure 4C:
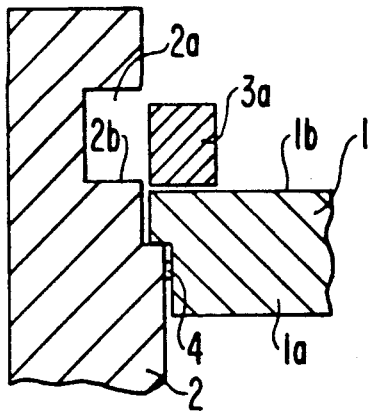

FIGS. 1(A) and 1(B) show a closure means according to the present invention for a cover 1 to be installed in a vessel shell 2 of the type shown in FIGS. 4(A) and 4(B), and which is about to be actuated. The vessel shell has a mouth 2m and a retaining-ring accommodating portion 2r extending upwardly from the mouth 2m. The interior pressure in the shell corresponds to the atmospheric pressure. The cover 1 has a sealing projection 1a projecting into mouth 2m and a sealing means 4 between the radial face thereof and the interior face of mouth 2m. The cover can thus rise a short distance from an innermost position to an outer position without breaking the seal formed by sealing means 4. The closure means is constituted by a segmented retaining-ring 3 which in its non-retaining position is enclosed in a circular retaining-ring receiving recess or groove 2a in the inner face of the retaining-ring accommodating portion 2r and has a lower edge spaced just slightly above a segment engaging surface 1b' on cover 1 with the with the cover in the closure position when there is atmospheric pressure in the vessel, so as to provide a positive clearance between the lower edge of groove 2a and surface 1b' which is less than the short distance the cover can move without breaking the seal of seal 4. The inner surfaces of the segments 3a are also clear of the path of movement of the cover when it is moved vertically of the shell. The segments 3a of the retaining-ring 3 are fitted snugly in the groove 2a and slidable in the radial direction somewhat in the manner of a piston sliding in a cylinder, each having a rod 6 snugly slidably inserted through a hole 7 drilled through the shell (C in the drawing shows the direction of movement of the retaining-ring segment and rod). The cover 1 preferably has the segment engaging surface 1b' at a level below the upper surface 1b and around the outer periphery of the cover.

Figure 2A:
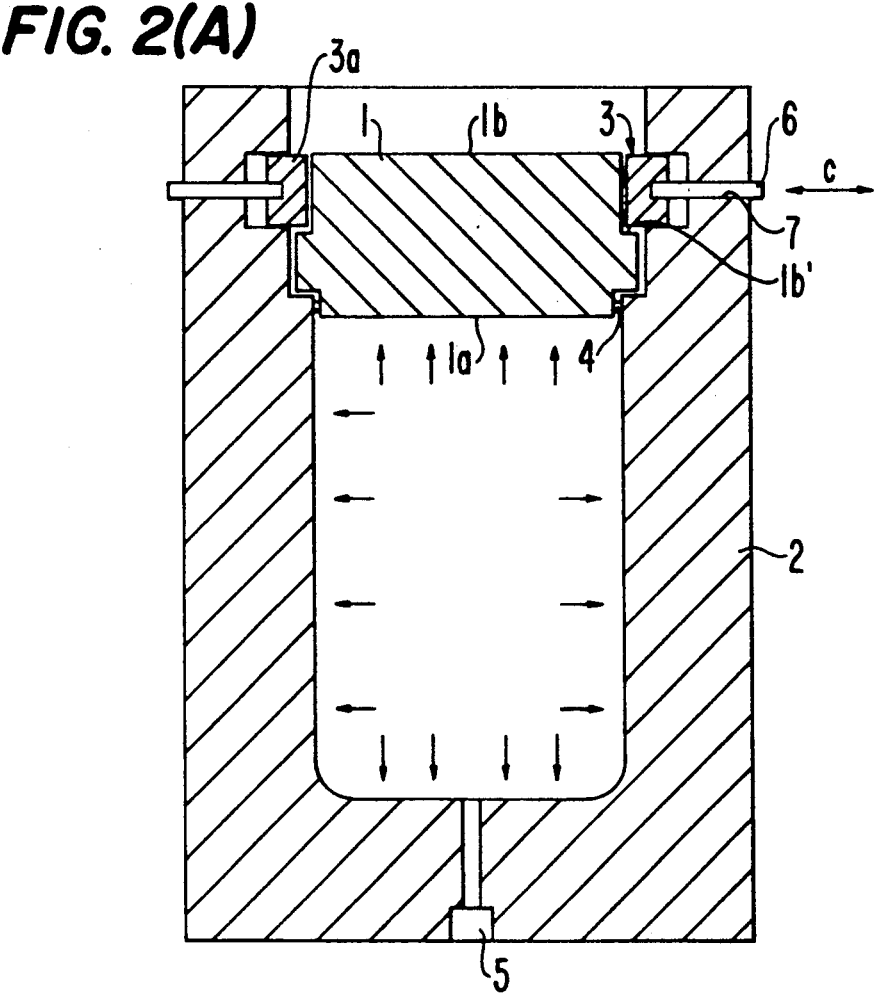
FIG. 2(A) is a vertical sectional view of the closure of FIGS. 1(A) and 1 (B) showing the state in which the retaining-ring is engaged with the cover.
Figure 2B:
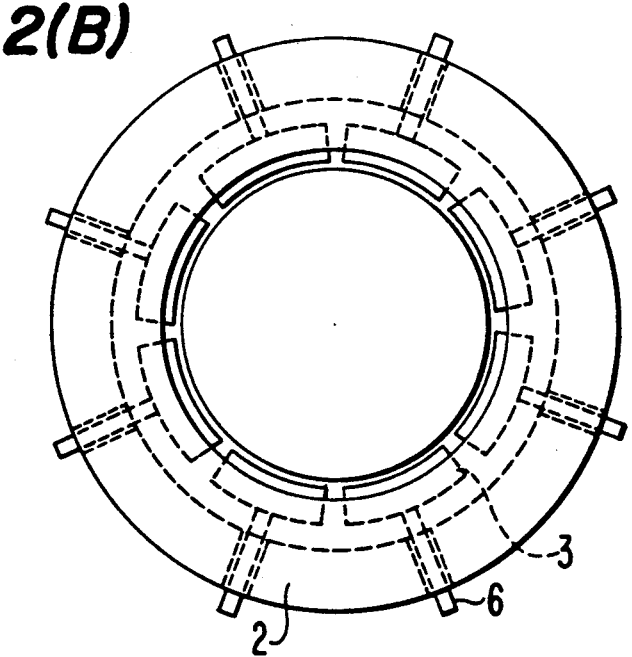
FIG. 2(B) is a plan view of the closure of FIG. 2(A)

FIGS. 2(A) and 2(B) show the state in which the retaining-ring segments 3a have been slid radially inward toward the center of the cover 1 from the state shown in FIGS. 1(A) and 1(B) to a retaining position by exerting a pushing force on rods 6 so as to position the segments 3a over the segment engaging surface 1b' around the outer edge of the cover 1. The positive clearance assures that there will be no interference between the segment 3a and the cover. Moreover, the segments can abut the portions of the cover above the segment engaging surface 1b' to limit the inward movement thereof. When the segments 3a of the retaining-ring 3 have moved from the non-retaining positions shown in FIGS. 1(A) and 1(B) to the retaining positions shown in FIGS. 2(A) and 2(B), the vessel is ready for applying inner pressure which will raise the cover 1 against the ring 3 without breaking the seal of seal 4. When it is required to open the cover after the operation, the vessel is depressurized until atmospheric pressure is reacted within the vessel. Then the retaining-ring segments 3a are retracted into groove 2a to the state shown in FIGS. 1(A) and 1(B) by exerting the pulling force on the rods 6. Then the cover is ready to be opened by lifting it upward.

Figure 4D:
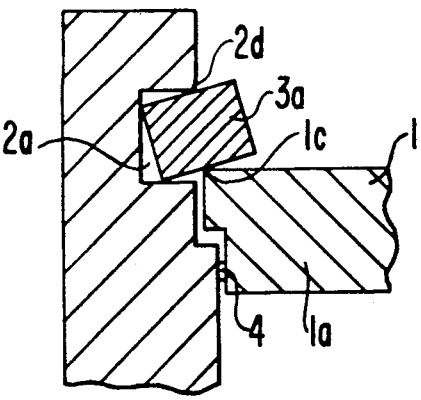
Figure 4E:
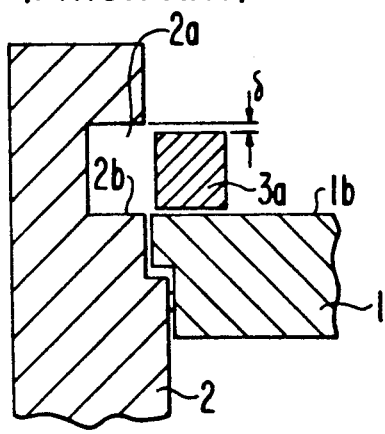
Figure 4F:
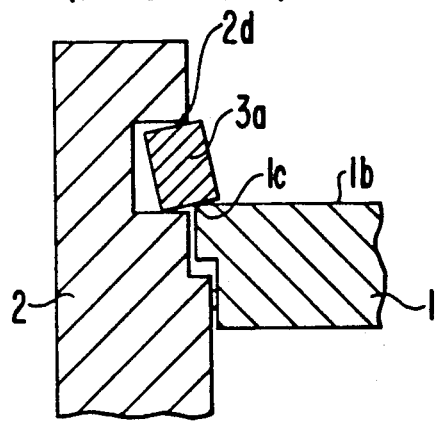
Figure 4G:
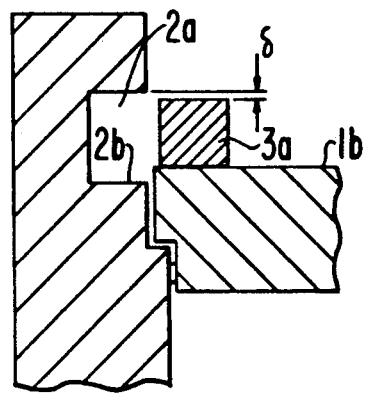
Figure 4H:
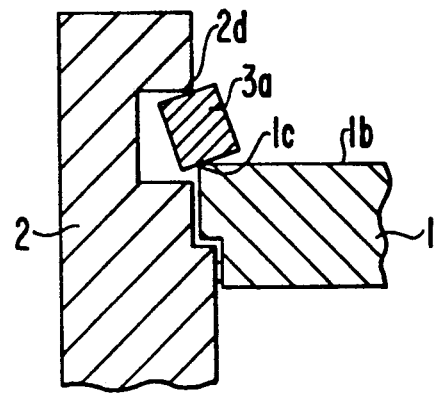

Because the segments need only slide partly out of groove 2a and then back into this groove, they can be fitted snugly therein. No significant clearance need be left as is the case where the segments have to be moved into the groove from inside the vessel as in FIGS. 4(A)–4(H). As a result, when the cover 1 is raised due to internal pressure within the vessel, the segments do not tilt, as they do in the prior art structure as shown in FIGS. 4(D), 4(F) and 4(H). Thus, there is no edge-to-surface contact of the parts, but rather only surface-to-surface contact, so that the life of the parts is prolonged.

The most favorable method is chosen for applying a pushing or pulling force to achieve the radial movement of the rods 6 depending on the size of the vessel, the degree of internal pressure, the weight of the retaining-ring segments, the time required for the cover activation, and demands from customers. Typical examples of major driving methods are as follows:

1. Applying the force manually.
2. Applying the force by screw means.
3. Applying the force by gear means.
4. Applying the force by hydraulic pressure.

Thus, the time required for closing can be shortened remarkably, for example, to 3–10 minutes, as has been found from the results of actual operations.

By the operation described above, (a) only a short horizontal sliding distance of the retaining-ring segment is required and the operation can be easily performed manually. Also, operation of the retaining-ring segments from the outside of the shell makes the operation safe; and (b) The time required for activation can be shortened from the conventionally required time of about two hours to approximately five minutes, resulting in sharp increases in operation efficiency.

Figure 3A:
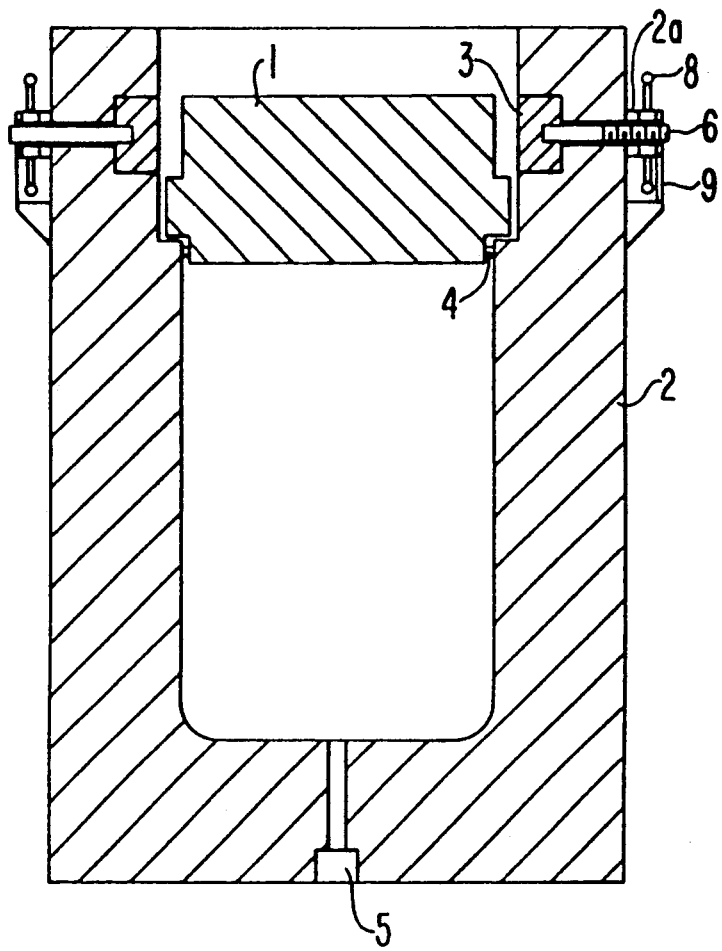
FIG. 3(A) is a vertical sectional view of an example a driving means for a rod of a retainer segment.
Figure 3B:
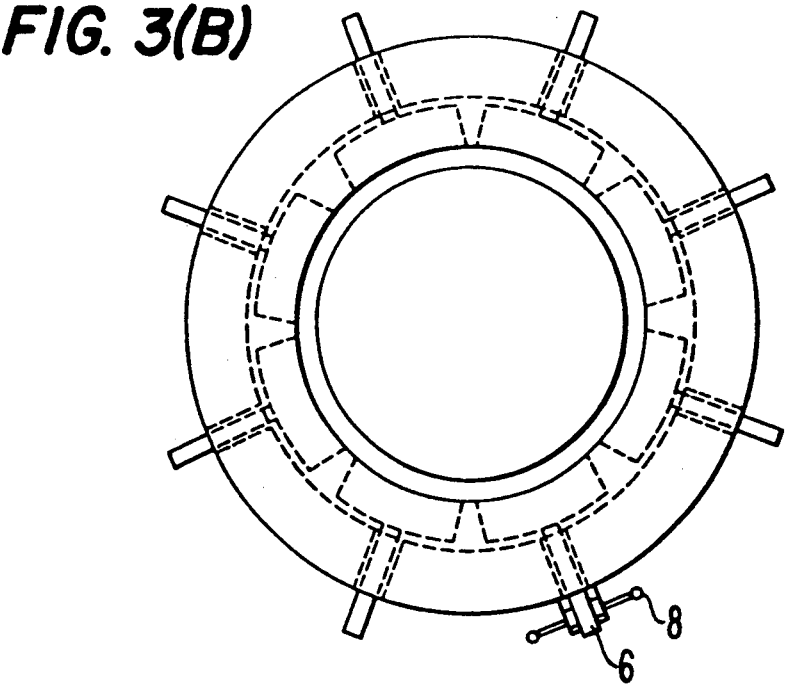
FIG. 3(B) is a plan view of the driving means of FIG. 3(A)

FIGS. 3(A) and 3(B) show an embodiment of means according to the present invention for moving the retaining-ring segments into and out of the shell.

As has been described above, various methods can be used depending on the conditions for driving the segments of the retaining-ring 3 after the cover 1 has been lowered onto the shell 2. But in this embodiment, a screw means is used. Each rod 6 is threaded at the outer end and has a threaded handle 8 thereon (not shown on all rods in FIG. 3(B)). The threaded handle 8 is held between a shell-mounted bearing flange 2a and support 9. For moving the segments of the retaining-ring 6 inwardly over the cover, the handles 8 are rotated in one direction. Conversely, when moving the segments away from the cover to permit opening of the vessel, reverse rotation of the handles 8 causes the rods 6 and the retaining-ring segments to move outwardly. The amount of movement of the segments of the retaining-ring 3 depends on the condition of the vessel (pressure temperature, material used, the frequency of operation, accuracy in manufacturing, etc.), but in this embodiment, approximately 80 mm of movement is enough for smooth operation.

The present invention which has the above structural features can achieve the following remarkable effects.

(a) Only a short distance of horizontal movement of the retaining-ring segments is required for moving them over the cover, and this can be achieved in a simple manner. For this operation, only slight labor, mechanical power or hydraulic pressure is required. Moreover, full automation is made possible for the operation of moving the segments of the retaining-ring. Thus, safety of operation is improved remarkably.

(b) The time required for operation which has been the most important factor for increasing the operation efficiency at high pressure, can be greatly shortened, contributing substantially to improvement in operation efficiency.

(c) The snug fit of the segments of the retaining-ring with the receiving groove therefore produces surface-to-surface contact of the segments with the groove surfaces, instead of edge-to-surface contact, thereby prolonging the life of the parts.

(d) Conventionally, as described above, clamp-type, clutch-type, screw-type, press-frame-type and other types of devices have been used for closing the cover quickly. But the retaining-ring type has not been suitable for quick operation. Quick operation has been made possible by the present invention and actuation of the retaining-ring type closure means has been made possible at a speed equal to or faster than that for other acting systems.

Moreover, the retaining-ring system of the present invention is less expensive to manufacture than other systems, and economically advantageous.

What is claimed is:

1. A pressure vessel having a quick-acting retaining ring-type closure means, comprising:

a vessel shell having a mouth with a radially inwardly facing surface and a retaining ring accommodating portion extending upwardly from said mouth;

a cover for closing said mouth of said vessel and having a sealing projection extending into said mouth when said cover is on said shell in position for closing said mouth and having an upwardly facing segment engaging surface around the periphery thereof above said sealing projection;

a radially facing seal means in sealing engagement between said radially inwardly facing surface of said mouth and said sealing projection and permitting a short movement of said sealing projection and cover in a direction out of said mouth from an innermost position to an outer position without breaking said sealing engagement;

the inner face of said retaining ring accommodating portion having an inwardly open circular groove having a lower surface spaced above said segment engaging surface a distance less than the distance of said short movement of said cover when said cover is in the innermost position for providing a positive clearance;

said retaining ring accommodating portion having a plurality of radially extending holes therethrough opening into said groove and spaced circumferentially around said retaining ring accommodating portion;

a segmented retaining ring accommodated in said circular groove and being mounted for movement between a non-retaining position in which the radially inner edges of the segments are radially clear of the edge of said cover when said cover is removed from said shell and a retaining position in which the radially inner edges of the segments are over said segment engaging surface and the radially outer edges are within said circular groove; and a plurality of rods, one on each segment and extending through one of said holes, whereby a radially inward force can be exerted on said rods for moving said segments radially inwardly to said retaining position with the radially inner edges over said segment engaging surface for, when said pressure vessel is pressurized and said cover moves upwardly by said short movement, blocking movement of said cover off said shell, and a radially outward force can be exerted on said rods for moving said segments radially outwardly to said non-retaining position to free said cover for removal from said shell.

2. A pressure vessel as claimed in claim 1 further comprising force exerting means connected to said rods for exerting said radially inward and radially outward forces.

3. A pressure vessel as claimed in claim 1 in which said segment engaging surface is spaced below the top of said cover, whereby said segments can abut a portion of the cover between said segment engaging surface and the top of said cover when said segments are in the retaining position to limit radial inward movement thereof.

* * * * *